Jan. 20, 1925.  
L. M. HOROWITZ  
1,523,993
BRAKE ADJUSTING MECHANISM
Filed Oct. 31, 1923    2 Sheets-Sheet 1
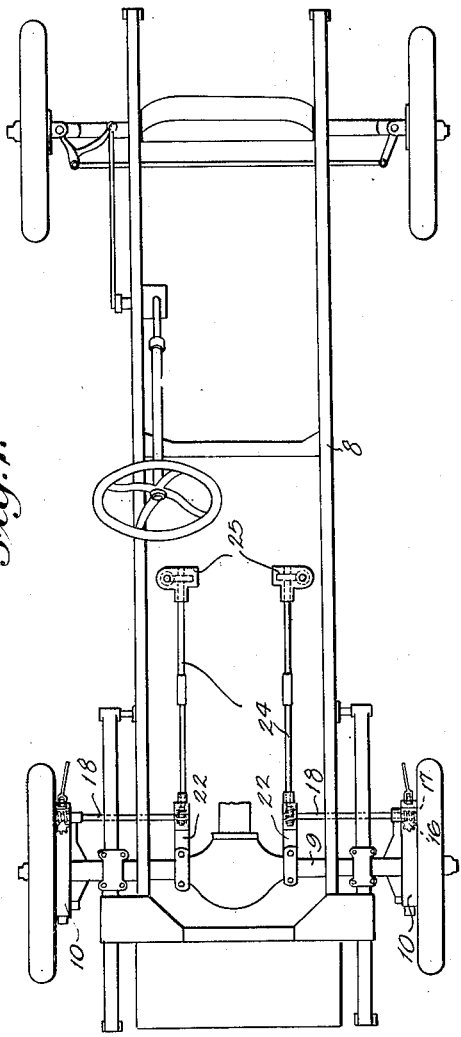
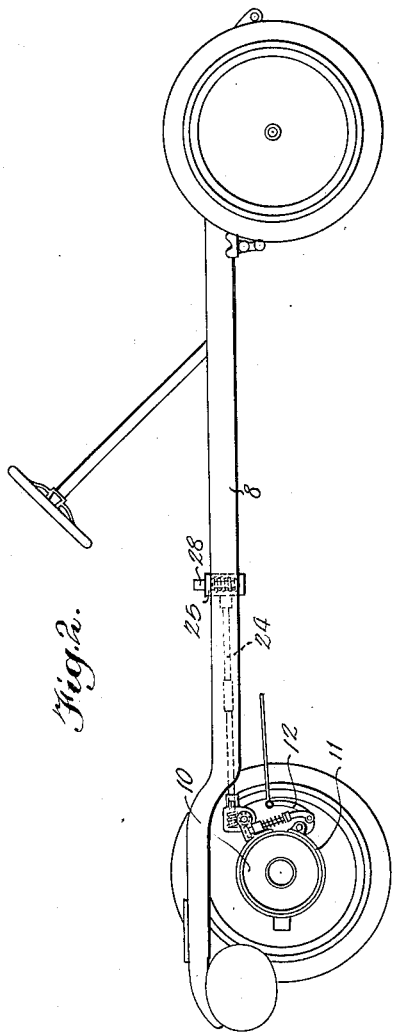
WITNESSES
INVENTOR
L. M. HOROWITZ
BY
ATTORNEYS

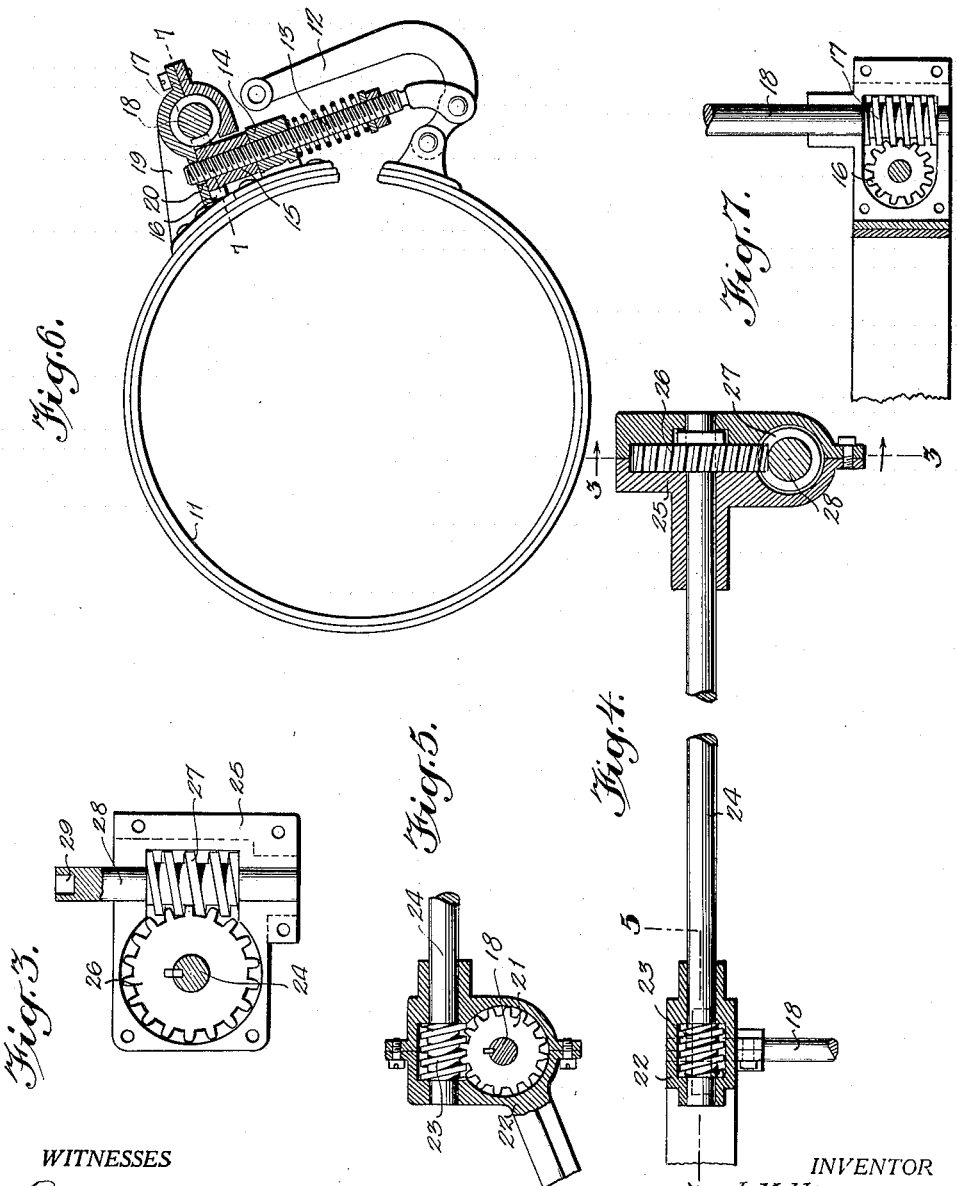

Patented Jan. 20, 1925.

1,523,993

UNITED STATES PATENT OFFICE.

LEONARD M. HOROWITZ, OF NEW YORK, N. Y.

BRAKE-ADJUSTING MECHANISM.

Application filed October 31, 1923. Serial No. 671,916.

*To all whom it may concern:*

Be it known that I, LEONARD M. HOROWITZ, a citizen of the United States, and a resident of the city of New York, borough of Manhattan, in the county and State of New York, have invented a new and Improved Brake-Adjusting Mechanism, of which the following is a full, clear, and exact description.

This invention relates generally to improvements in motor vehicles, and has particular reference to a brake adjusting mechanism therefor.

An object of the invention is to facilitate the adjustments of a brake by providing means whereby said adjustments may be accomplished at a point remote from said brake and while the vehicle is in motion.

Another object is to provide an adjusting mechanism which may be applied to vehicles of known and standard constructions without necessitating any changes being made in such constructions.

The above and other objects will appear more clearly from the following detail description, when taken in connection with the accompanying drawings, which illustrate a preferred embodiment of the inventive idea.

In the drawings—

Figure 1 is a fragmentary plan view of the chassis of an automobile showing the brake adjusting mechanism applied thereto;

Figure 2 is a side elevation;

Figure 3 is a sectional view on the line 3—3 of Figure 4, illustrating a portion of the operating mechanism, which is preferably located adjacent the driver's seat of the vehicle;

Figure 4 is a fragmentary longitudinal section through the operating mechanism;

Figure 5 is a sectional view on the line 5—5 of Figure 4;

Figure 6 is an elevation, partly in section, of a brake band and associated mechanism, showing a portion of the operating means for said band; and Figure 7 is a section on the line of 7—7 of Figure 6.

The drawings illustrate partially a motor vehicle which may be of any well known construction and which includes the chassis 8, the rear axle housing 9 and brake mechanisms 10, each of which includes a brake band 11, which is commonly known as the exterior braking element ordinarily operated by the foot pedal. Inasmuch as each of the adjusting mechanisms of the present invention is individual to one brake, a description of one of said mechanisms will suffice.

Referring more particularly to Figure 6, it will be seen that the brake band 11 has associated therewith an operating lever 12 to which is pivotally connected the screw member 13, the intermediate portion of which is engageable in a lug 14 carried by the brake band adjacent one end thereof. A nut 15 is mounted on the screw member 13 and utilized by its rotation to effect adjustments of the brake band 11 with respect to the drum with which it is associated. The construction so far described is well known and employed merely for the purpose of illustrating the application of the present invention to a standard type of brake mechanism. In making adjustments of brakes of this character, it is now necessary to apply a wrench or other tool to the adjusting nut 15 to make the necessary adjustments. To do this the vehicle must be at a standstill and experience has shown that this operation oftentimes must be repeated before the proper adjustments are attained. By the use of the present invention, the necessity for repeatedly running and stopping the vehicle and making adjustments is obviated, since it is possible to make these adjustments while the vehicle is in motion.

To this end each adjusting nut 15 is provided upon one end thereof with an annular row of gear teeth 16 which mesh with the worm 17 carried by a transversely extending shaft 18, the nut 15, worm 17 and portion of the shaft 18 being preferably enclosed in a suitable housing 19 secured to the brake band 11. The housing 19 is provided therein with an opening 20 through which the upper end of the screw member 13 extends so as to permit of movements of said screw member when the nut 15 is being operated. The end of the shaft 18 opposite that carrying the worm 17 carries a gear 21 which is mounted in a suitable housing 22 supported on the axle housing 9, preferably at a point adjacent the differential. The gear 21 meshes with a worm 23 also mounted in the housing 22 and carried by a longitudinally extending shaft 24 which projects forwardly toward the intermediate portion of the chassis where the driver's seat is located. The shaft 24 is preferably formed in sections which may be connected in any well known manner so as to permit of relative movement between the sections to compensate for movements of the rear end of the vehicle when traveling. The forward end of the shaft 24 extends into a housing 25 and carries thereon a gear 26, also disposed within said housing, which gear meshes with a worm 27 carried by a vertically arranged stub shaft 28, also having a bearing in said housing. The upper end of the shaft 28 projects beyond the housing 25 and is preferably provided in the end thereof with a recess 29 which may be engaged by a suitable tool to rotate the shaft in either direction and thus impart a similar movement to the adjusting nut 15 through the medium of the gearing connecting said parts.

The various housings 19, 22 and 25 are preferably constructed in such manner as to contain a suitable lubricant for the gearing mounted in said housings.

What is claimed is:

1. In a motor vehicle, the combination with a brake band and means including a nut for adjusting said band; of means for operating said nut, and means operable at a point remove from the last-named means for actuating the same.

2. In a motor vehicle, the combination with a brake band associated with a wheel of the vehicle, and means including a nut for adjusting said band; of means engageable with said nut for operating the same, and means adjacent the driver's seat of said vehicle for actuating the last-named means.

3. In a motor vehicle, the combination with a brake band and means including a rotatable member for adjusting said band; of gearing associated with said rotatable member to actuate the same, a rotatable shaft located at a point remote from said gearing, and other gearing connecting said shaft with the first-named gearing for operating the latter upon rotation of said shaft.

LEONARD M. HOROWITZ.